(12) United States Patent
Li et al.

(10) Patent No.: US 10,863,849 B2
(45) Date of Patent: Dec. 15, 2020

(54) MULTI-PURPOSE SMART RICE COOKERS (71) Applicant: MIDEA GROUP CO., LTD., Foshan (CN)

(72) Inventors: Xiaochun Li, San Ramon, CA (US); Linnan Zhu, Shenzhen (CN); Hua Zhou, San Jose, CA (US)

(73) Assignee: MIDEA GROUP CO. LTD., Foshan (CN)

(*) Notice: Subject to any disclaimer, the term of this patent is extended or adjusted under 35 U.S.C. 154(b) by 331 days.

(21) Appl. No.: 15/770,731

(22) PCT Filed: Apr. 16, 2018

(86) PCT No.: PCT/CN2018/083175
§ 371 (c)(1),
(2) Date: Apr. 24, 2018

(87) PCT Pub. No.: WO2019/200504
PCT Pub. Date: Oct. 24, 2019

(65) Prior Publication Data
US 2019/0313833 A1 Oct. 17, 2019

(51) Int. Cl.
A47J 27/08 (2006.01)
A47J 27/21 (2006.01)
(Continued)

(52) U.S. Cl.
CPC ..... *A47J 27/0802* (2013.01); *A47J 27/21083* (2013.01); *G06N 3/08* (2013.01); *G06T 7/0002* (2013.01); *G06T 2207/30* (2013.01)

(58) Field of Classification Search
CPC .............. A47J 27/0802; A47J 27/21083; A47J 36/321; G06T 7/0002; G06T 2207/30; G06N 3/08; G06N 3/0454; G06N 3/084
See application file for complete search history.

(56) References Cited

U.S. PATENT DOCUMENTS

2016/0059412 A1* 3/2016 Oleynik .................. B25J 13/02
700/257
2016/0278563 A1* 9/2016 Choudhary ............... A23L 5/00

FOREIGN PATENT DOCUMENTS

CN 1125553 A 7/1996
CN 2740097 Y 11/2005
(Continued)

OTHER PUBLICATIONS

Machine translation of Zhang, CN 102824099A, Dec. 2012 (Year: 2012).*
(Continued)

*Primary Examiner* — Ryan J. Walters
(74) *Attorney, Agent, or Firm* — Morgan, Lewis & Bockius LLP (57) ABSTRACT A rice cooker assembly uses machine learning models to identify and classify different types of food stored. The rice cooker has a chamber including different compartments for storing different types of food. A camera is positioned to view an interior of the chamber. The camera captures images of the contents of the chamber. From the images, the machine learning model classifies the different types of food stored. The rice cooker determines a mixture of different types of food based on nutrition value and/or taste. The rice cooker creates the mixture and controls the cooking process accordingly. The one or more machine learning models may be resident in the rice cooker or it may be accessed via a network.

9 Claims, 6 Drawing Sheets (51) Int. Cl.
    *G06T 7/00*     (2017.01)
    *G06N 3/08*     (2006.01)

(56) References Cited

FOREIGN PATENT DOCUMENTS

| | | |
|---|---|---|
| CN | 102824099 A | 12/2012 |
| CN | 107736794 A | 2/2018 |
| KR | 100777116 B1 | 11/2007 |

OTHER PUBLICATIONS

Machine translation of Wen, CN107736794, Feb. 2018 (Year: 2018).*

PCT International Search Report and Written Opinion, PCT Application No. PCT/CN2018/083175, dated Dec. 28, 2018, 9 pages.

* cited by examiner

MULTI-PURPOSE SMART RICE COOKERS

BACKGROUND

1. Technical Field

This disclosure relates generally to control of cooking appliances such as rice cookers.

2. Description of Related Art

Rice is a staple food source. For health and/or taste reasons, many people prefer to mix rice with other ingredients. Rice mixture with different ingredients require different cooking environment. However, conventional rice cookers do not provide users with controls to cook different rice mixtures to their optimal taste. The users may be able to select the cooking mode such as white rice, brown rice, or quick cook, but not much more. Once set, the rice cooker blindly carries out the user's instructions, without regard to what rice mixture is being cooked, whether the user's selections will produce the optimal taste of the rice mixture, or whether the rice mixture is over- or under-cooked at the end of the cooking time. In addition, conventional rice cookers do not suggest to users optimal combinations of rice mixtures. Thus, there is a need for more intelligent rice cookers.

SUMMARY

A rice cooker assembly uses machine learning models to identify and classify different types of food. The rice cooker assembly includes one chamber for receiving food and another chamber that includes different compartments that can be used for storing different types of food. The rice cooker assembly includes a camera positioned to view an interior of one or both chambers. The camera captures images of the contents of a chamber. From the images, the machine learning model classifies the different types of food. The rice cooker assembly determines which compartment of the chamber to store a particular type of food. The rice cooker determines a mixture of different types of food based on nutrition value and/or taste. The rice cooker creates the mixture and controls the cooking process accordingly. The one or more machine learning models may be resident in the rice cooker or it may be accessed via a network.

This process may be used to set the initial cooking process for the rice cooker, including selection of the proper cooking mode and setting the temperature-time curve for cooking. It may also be used to automatically adjust the cooking process as cooking progresses. Control of the cooking process can also be based on user inputs, temperature sensing, historical performance data and other factors.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the accompanying drawings, in which:

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1:
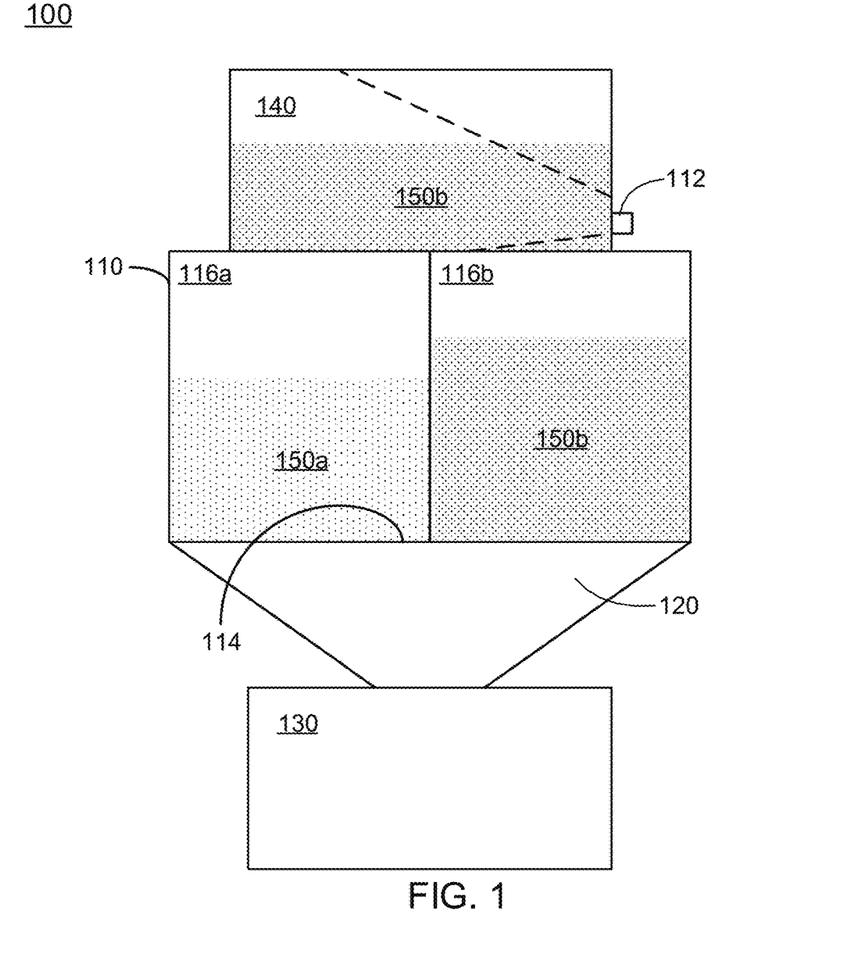
FIG. 1 is a cross-section view of a rice cooker assembly, according to an embodiment.

FIG. 1 is a cross-section view of a rice cooker assembly 100 according to an embodiment. The rice cooker assembly 100 includes a storage chamber 110, a conduit 120, a cooking chamber 130, and a pre-storage chamber 140. Food 150 is placed in the storage chamber 110 for storage. The storage chamber 110 can include one or more compartments 116 for storing the food 150. Different compartments can be used to store different types of food (e.g., grains, nuts, dried fruits, etc.) For example, as illustrated, the compartment 116a stores the first type of food 150a and the compartment 116b stores the second type of food 150b. A letter after a reference numeral, such as "116a," indicates that the text refers specifically to the element having that particular reference numeral, while a reference numeral in the text without a following letter, such as "116," refers to any or all of the elements in the figures bearing that reference numeral.

The pre-storage chamber 140 receives and temporarily holds food 150 before the food 150 is transferred to the storage chamber 110 for storage. The pre-storage chamber 140 is made of transparent materials such as glass or acrylic, that are preferable anti-scratch. The pre-storage chamber 140 includes one or more gates (not shown) configured to create one or more openings on a bottom support of the pre-storage chamber 140 thereby to allow the food 150 to be transferred from the pre-storage chamber 140 to the storage chamber 110. The one or more openings can be located at different locations of the storage chamber 110. The different locations may correspond to different compartments of the storage chamber 110. As such, the food 150 can be distributed from the pre-storage chamber 140 to different compartments of the storage chamber 110.

The rice cooker assembly 100 includes a camera 112 positioned to view the interior of the pre-storage chamber 140. In the illustrated example, the camera 112 is located on an exterior surface of a side wall of the pre-storage chamber 140. The camera's field of view is shown by the dashed lines. In other embodiments, the camera 112 is located on a bottom support or a top lid of the pre-storage chamber 140. For example, the camera 112 is located on the exterior surface of the side wall or the bottom support. The exterior surface may include an optical coating to reduce reflection thereby allowing the camera to capture better quality images. The camera 112 can take colored pictures of the contents (e.g., the food 150) of the storage chamber 110.

The food 150 can be classified using the pictures taken by the camera 112. Based on the classification, the food 150 can be distributed into different compartments of the storage chamber 110 for storage. For example, as illustrated, the food 150b being held by the pre-storage chamber 140 is distributed into the compartment 116b of the storage chamber 110 for storage. The compartment 116a of the storage chamber 110 is used to store a different type of food 150a. The distribution of the food 150 into a particular compartment of the storage chamber 100 can be regulated by controlling the one or more gates of the pre-storage chamber 140. For example, the one or more gates of the pre-storage chamber 140 are controlled to create an opening to the compartment 116b to allow the food 150b to be distributed from the pre-storage chamber 140 to the compartment 116b rather than the compartment 116a. The rice cooker assembly 100 tracks different types of food stored in different compartments of the storage chamber 110.

The pre-storage chamber 140 is cylindrically shaped, as illustrated. The pre-storage chamber 140 can be shaped in other shapes such as cuboid, pyramid, conical, cylindrical, and the like. In further embodiments, the pre-storage chamber 140 is configured to rotate. In the illustrated example, the pre-storage chamber 140 is directly attached to the storage chamber 110. In other embodiments, the pre-storage chamber 140 is attached to the storage chamber 110 via a conduit (not shown). The conduit is hollow and includes two ends: one end is attached to the storage chamber 110 and the other end is attached to or in proximity to the storage chamber 110. In these cases, the pre-storage chamber 140 includes a gate that is configured to create an opening on the bottom support of the pre-storage chamber 140. The gate is located in a center of the bottom support of the pre-storage chamber 140. The conduit is attached to the gate to guide the food 150 to be transferred from the pre-storage chamber 140 to the storage chamber 110. The rotation of the pre-storage chamber 140 or the rotation of the conduit adjusts a location of the end of the conduit that is attached to or in proximity to the storage chamber 110. As such, the food 150 can be delivered by the conduit to different compartments of the storage chamber 110.

The storage chamber 110 can be made of transparent materials such as glass or acrylic, that are preferably anti-scratch. In other embodiments, the storage chamber 110 is made of opaque or transparent materials. The storage chamber 110 includes one or more gates 114. Opening a gate 114 creates an opening on a bottom support of the storage chamber 110. The opening allows the food 150 to be dispensed from the storage chamber 110. A gate 114 can be configured to create an opening across multiple compartments 116 thereby to dispense food stored in the multiple compartments. As one example, if the compartment 116a stores rice and the other compartment 116b stores mung beans; the gate 114 is configured such that both rice and mung beans can be dispensed if the gate 114 is opened. The gate 114 is configured such that a dimension of the opening through the storage chamber 110 can be adjusted. A dimension of the opening through each compartment can be independently adjusted.

In some embodiments, the rice cooker assembly 100 includes another camera that is located on an exterior surface of the storage chamber 110 to capture contents in the storage chamber 110. The camera may be located on a side wall, a bottom support, or a top cover of the storage chamber 110. The camera is configured to move its location, for example, from being positioned above the compartment 116b to a location above the compartment 116a. By moving its location, the camera 112 can take pictures of contents of different compartments or of different sections of the storage chamber 110. In other embodiments, the storage chamber 110 is configured to adjust a position of the camera relative to different portions of the storage chamber 110. For example, the storage chamber 110 is configured to rotate and as a result, the camera is positioned above different sections of the chamber 110 or above different compartments of the chamber 110.

In further embodiments, the rice cooker assembly 100 includes a camera holder (e.g., the camera holder 340 illustrated in FIG. 3C) for affixing a camera 342. The camera 342 may not be in directly contact with the storage chamber 110. The storage chamber 110 is configured to move such that the camera 342 takes pictures of different portions of the storage chamber 110 or of different compartments of the storage chamber 110.

The rice cooker assembly 100 may include a cooking chamber 130 where the food 150 is cooked. The cooking chamber 130 can be connected to a water source (not sown) such as a water tank. The water source can be a part of the rice cooker assembly 100. In some embodiments, the cooking chamber 130 includes a scale for measuring an amount of food to be cooked.

The conduit 120 allows the food 150 to be moved from the storage chamber 110 to the cooking chamber 130 for cooking. The conduit 120 is hollow.

Figure 2:
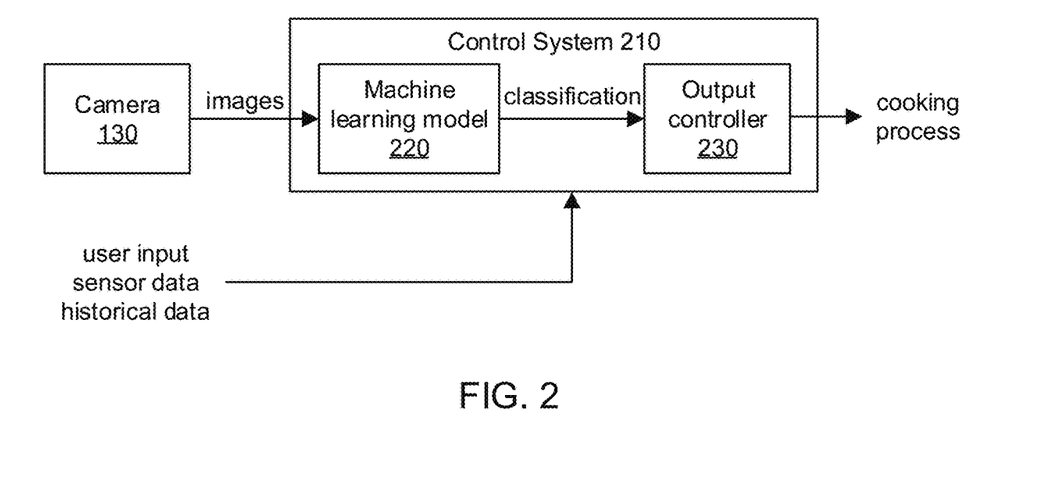
FIG. 2 is a block diagram illustrating control of the rice cooker, according to an embodiment.

FIG. 2 is a block diagram illustrating control of the rice cooker assembly 100. The control system 210 is roughly divided into one or more machine learning models 220 and an output controller 230. The machine learning model(s) 220 receives images captured by the camera 112.

From these inputs (possibly in combination with other additional inputs), the machine learning model 220 determines the contents in the pre-storage chamber 140 and/or in the storage chamber 110. Preferably, it identifies and classifies the food 150 from the images. For example, it identifies the type of the food 150 such as white rice, brown rice, red rice, and the like. If the storage chamber 110 includes multiple compartments, the machine learning model 220 identifies the type of the food 150 stored in a compartment.

The output controller 230 controls the distribution of the food from the pre-storage chamber 140 to the storage chamber 110 according to the identification and classification determined by the machine learning model 220. For example, the output controller 230 controls opening of the gate of the pre-storage chamber 140, rotation of the pre-storage chamber 140, and/or rotation of the conduit.

The output controller 230 controls the opening of the gate 114 according to the identification and classification determined by the machine learning model 220. Mixtures of different types of food 150 have different nutrition value. Users can benefit from different nutrients at different times. In addition, different people may have preferences for different mixtures. By controlling the opening of the gate 114, the output controller 230 can regulate an amount of the food 150 entering into the cooking chamber 130. For example, by regulating a dimension of an opening created by opening the gate 114, the output controller 230 can control an amount of the food 150 through the opening per unit time. As such, the output controller 230 can regulate a mixture of different types of the food 150 in the cooking chamber 130. Based at least on the classified types of the food, the controller 230 can select an optimal mixture. That is, the controller 230 selects a ratio between one type of food to another type of food. Ratios between different types of foods can be determined from health recipes recommended by nutritionists.

In addition, different types of grains will be cooked differently, including using different temperatures and times as well as different water amounts. When mixed with other types of non-grains food such as nuts or fruits, the cooking requirement for the mixture may further vary. Moreover, different users may have different preferences for textures (e.g., firmness, stickiness, etc.). Some people prefer a more chewy texture whereas others prefer a softer texture.

The output controller 230 controls the cooking process for the food according to the identification and classification determined by the machine learning model 220. One aspect controlled by the output controller 230 typically is the temperature-time curve for cooking the food 150. Based at least on the classified one or more types of food component, the controller 230 can select the right temperature and the right cooking time. The right temperature and the right cooking time may also be selected based on the amount of the food to be cooked. Furthermore, rather than cooking at a constant temperature for a certain amount of time (e.g., boiling for 20 minutes), the controller may specify a temperature-time curve that varies the temperature as a function of time. The controller 230 may further select a water amount used for cooking the food.

The controller 230 may also take other factors into consideration, such as user inputs, or temperature monitoring of the cooking chamber or of the food. The user's preferences for textures will influence the ratio determination. The mixing can be actively monitored based on monitoring the contents of the cooking chamber 130. For example, if a scale indicates that the mixture has reached the correct weight of the food for that particular type of food, the output controller 130 may close the gate 114. The user's preferences for texture (e.g., stickiness, firmness) will influence the temperature-time curve. In addition, the cooking can be actively monitored based on monitoring the temperature of the cooking chamber or of the food. For example, if a thermometer indicates the mixture has reached the correct internal temperature, the controller may end the cooking process even if the allotted cooking time has not been reached.

In addition to the temperature-time curve, the controller 230 may also adjust other quantities. For example, if the rice cooker has different cooking modes, the controller may select the correct cooking mode for the detected type(s) of food components. Examples of cooking modes include white rice, brown rice, and mixed rice. More sophisticated cooking modes are possible. For example, the white rice cooking mode may be subdivided into white rice with a firmness level and/or a stickiness level that each can be selected from a range. If the cooking process has different phases, such as soaking, pre-heating, boiling, finishing, and keeping warm, the controller 230 may determine when to transition from one phase to the next. The controller can also provide notification when the cooking process is completed.

In addition to controlling the cooking process, the control system 210 controls whether the storage chamber 110 should be emptied or refilled. For example, if the food level in the storage chamber 110 is low, the output controller 230 determines that the storage chamber 110 should be refilled. For example, the output controller 230 generates a signal to alert the user to refill the storage chamber 110. It may also provide notification if the storage chamber stores different types of food.

Figure 3A:
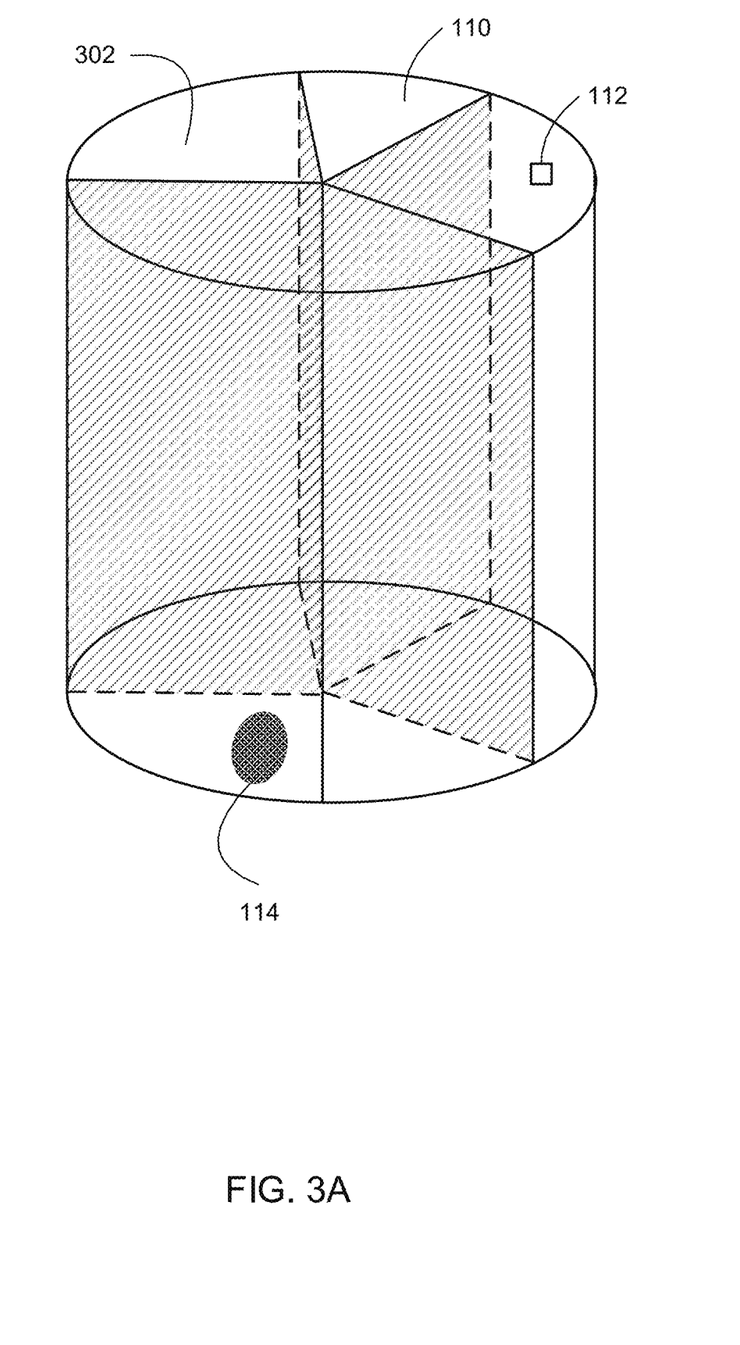
FIG. 3A is a perspective view of a storage chamber assembly, according to an embodiment.
Figure 3B:
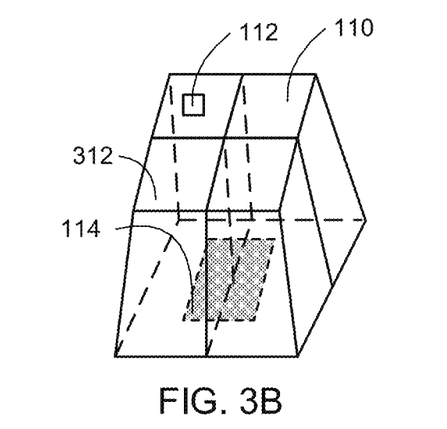
FIG. 3B is a perspective view of a storage chamber assembly, according to an embodiment.
Figure 3C:
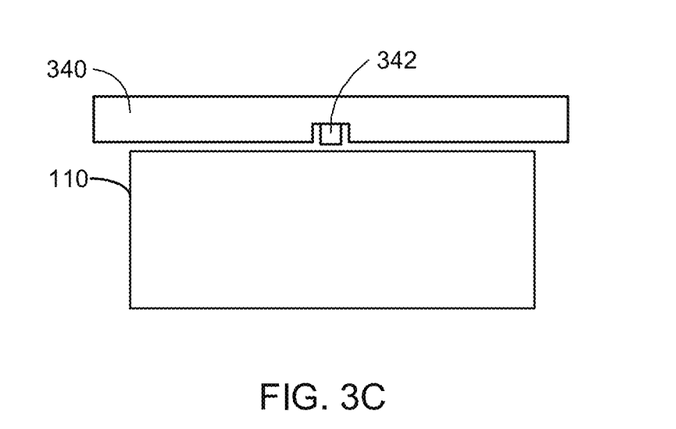
FIG. 3C is a cross-section view of a storage chamber assembly, according to an embodiment.

FIG. 3A is a perspective view of a storage chamber assembly, according to an embodiment. The storage chamber 110 includes multiple compartments 302. The storage chamber further includes the gate 114, and the rice cooker assembly includes the camera 112, both of which are described in connection with FIG. 1. Description of the camera 112 and the gate 114 is omitted herein. As illustrated, the storage chamber 110 and the compartments are cylindrically shaped. The storage chamber 110 and the compartments can be shaped in other shapes such as cuboid, pyramid, conical, and the like. For example, as illustrated in FIG. 3B, the storage chamber 110 is trapezoidally shaped. The storage chamber 110 includes compartments 312 that are also trapezoidally shaped. Similar to the embodiment illustrated in FIG. 3A, the storage chamber 110 includes the gate 114 and the rice cooker assembly includes the camera 112. The gate 114 is positioned on a bottom surface of the storage chamber 110 such that it overlaps with all compartments. The compartments 302 can be of different dimensions. For example, a larger compartment is used to store more-frequently consumed food such as rice and a smaller compartment is used to store less frequently consumed food such as mung beans.

Figure 4A:
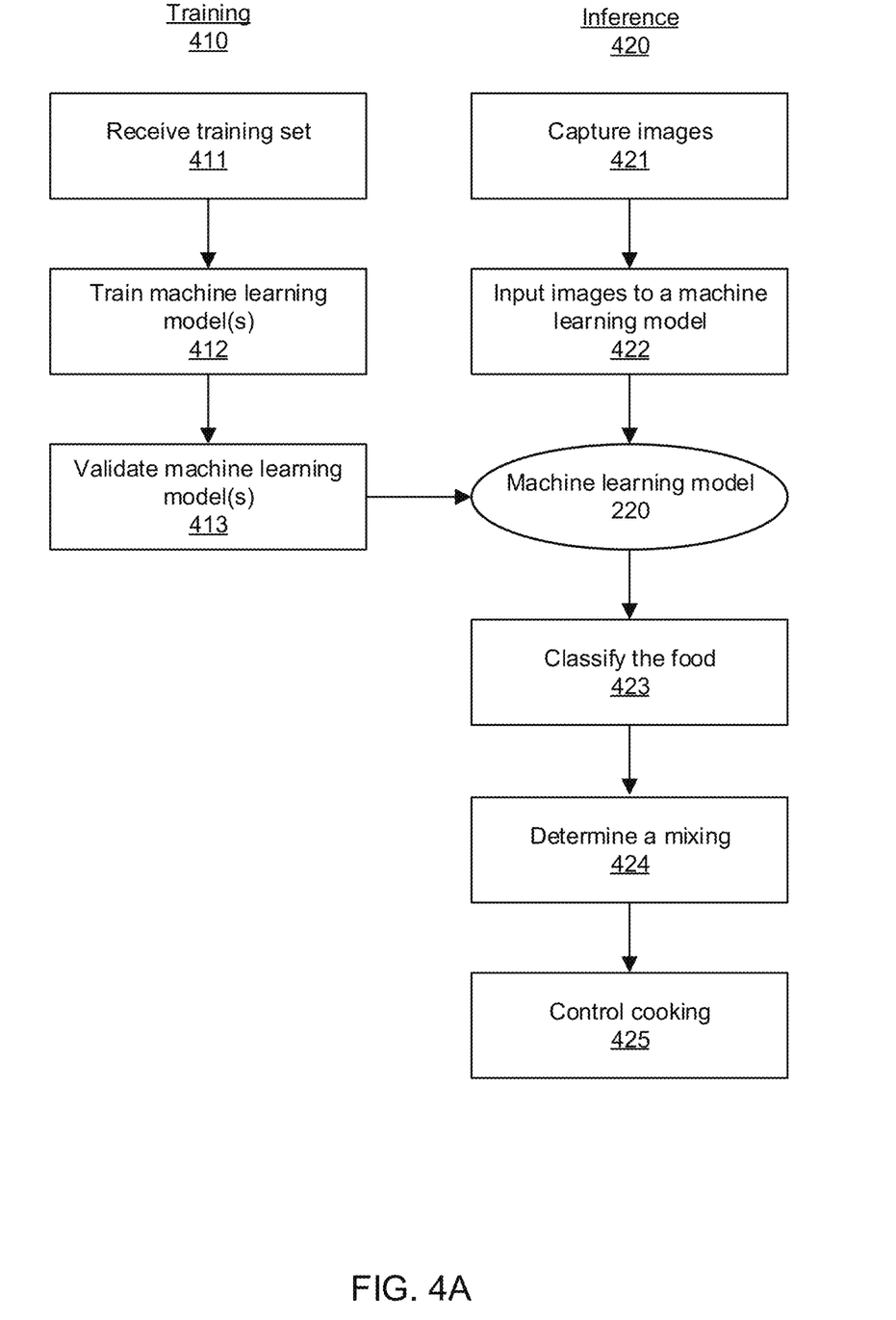
FIG. 4A is a flow diagram illustrating training and operation of a machine learning model, according to an embodiment.

FIG. 4A is a flow diagram illustrating training and operation of one or more machine learning models 220, according to an embodiment. The process includes two main phases: training 410 the machine learning model(s) 220 and inference (operation) 420 of the machine learning model(s) 220.

A training module (not shown) performs training 410 of the machine learning model(s) 220. In some embodiments, a machine learning model 220 is defined by an architecture with a certain number of layers and nodes, with biases and weighted connections (parameters) between the nodes. In one example, the machine learning model 220 includes a Convolutional Neural Network (CNN) based machine learning model. The CNN based machine learning model may be based on various architectures such as AlexNet, VGGNet, GoogleNet, ResNet, and the like. During training 410, the training module determines the values of parameters (e.g., weights and biases) of the machine learning model 220, based on a set of training samples.

Figure 4B:
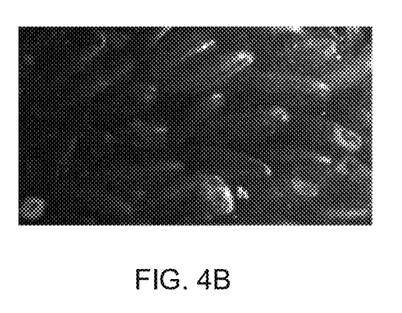
FIG. 4B illustrate an example training sample, according to an embodiment.
Figure 4C:
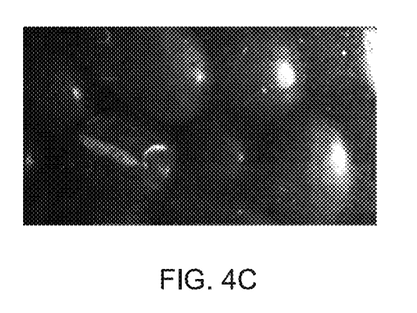
FIG. 4C illustrate an example training sample, according to an embodiment.
Figure 4D:
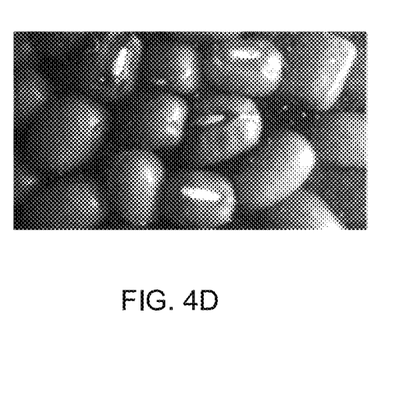
FIG. 4D illustrate an example training sample, according to an embodiment.

The training module receives 411 a training set for training. The training samples in the set includes images captured by the camera 112 for many different situations: different types of food, different mixtures of food, different lighting conditions, etc. For supervised learning, the training set typically also includes tags for the images. The tags include the attributes to be trained: types of different food, a ratio between different types of food, etc. In some embodiments, the training module applies a back propagation algorithm to optimize the model parameters. The training module may apply the stochastic gradient descending method to update the model parameters. Example training samples are illustrated in FIGS. 4B through 4D. The training samples are pictures of different types of grains: black rice, red beans, and mung beans.

In typical training 412, a training sample is presented as an input to a machine learning model 220, which then produces an output for a particular identification and/or for a particular classification. One or multiple machine learning models can be used to classify a particular type of food, identify whether the food includes different types of food components, and/or classify each identified food component. The difference between the machine learning model's output and the known good output is used by the training module to adjust the values of the parameters in the machine learning model 220. This is repeated for many different training samples to improve the performance of the machine learning model 220.

The training module typically also validates 413 the trained machine learning model 220 based on additional validation samples. For example, the training module applies the machine learning model 220 to a set of validation samples to quantify the accuracy of the machine learning model 220. The validation sample set includes images and their known attributes. The output of the machine learning model 220 can be compared to the known ground truth. Common metrics applied in accuracy measurement include Precision=TP/(TP+FP) and Recall=TP/(TP+FN), where TP is the number of true positives, FP is the number of false positives and FN is the number of false negatives. Precision is how many outcomes the machine learning model 220 correctly predicted had the target attribute (TP) out of the total that it predicted had the target attribute (TP+FP). Recall is how many outcomes the machine learning model 220 correctly predicted had the attribute (TP) out of the total number of validation samples that actually did have the target attribute (TP+FN). The F score (F-score=2*Precision*Recall/(Precision+Recall)) unifies Precision and Recall into a single measure. Common metrics applied in accuracy measurement also include Top-1 accuracy and Top-5 accuracy. Under Top-1 accuracy, a trained model is accurate when the top-1 prediction (i.e., the prediction with the highest probability) predicted by the trained model is correct. Under Top-5 accuracy, a trained model is accurate when one of the top-5 predictions (e.g., the five predictions with highest probabilities) is correct.

The training module may use other types of metrics to quantify the accuracy of the trained model. In one embodiment, the training module trains the machine learning model until the occurrence of a stopping condition, such as the accuracy measurement indication that the trained model is sufficiently accurate, or a number of training rounds having taken place.

Training 410 of the machine learning model 220 preferably occurs off-line, as part of the product development for the rice cookers. The trained model 220 is then installed on the rice cookers sold to consumers. A rice cooker can execute the machine learning model using fewer computing resources than is required for training. In some cases, the machine learning model 220 is continuously trained 410 or updated. For example, the training module uses the images captured by the camera 112 in the field to further train the machine learning model 220. Because the training 410 is more computationally intensive, it may be cloud-based or occur on a separate home device with more computing power. Updates to the machine learning model 220 are distributed to the rice cookers.

In operation 420, the machine learning model 220 uses the images captured 421 by the camera 112 as input 422. The camera 112 captures images of contents of the storage chamber, of different portions of the storage chamber, of different compartments of the storage chamber, and/or of the pre-storage chamber. The machine learning model 220 classifies 423 the contents captured in the images.

The machine learning model 220 classifies 423 types of the food. In one architecture, the machine learning model 220 calculates a probability of possible different outcomes, for example the probability that the content is a certain type of grain, a certain type of non-grain food, etc. Based on the calculated probabilities, the machine learning model 220 identifies which classification is most likely. For example, the machine learning model 220 might identify that mung bean is the most likely grain type. In a situation where there is not a clear cut winner, the machine learning model 220 may identify multiple classifications and ask the user to verify. For example, it might report that mung beans and read beans are both likely, with the user verifying which one.

The controller 230 determines 424 a mixture of different types of food based at least on the classification. The mixture can be determined according to nutrition value of the different types of food. The controller 230 determines the mixture such that the mixture delivers optimal nutrition value to users. The optimal nutrition value can be determined based on temperatures, seasons, users' health or medical information, users' age information, health recipes, and the like. In some embodiments, the controller 230 determines a ratio between a first type of food to a second type of food thereby to determine an optimal composition of nutrients. In addition, the mixture can be determined according to taste of different types of food. The controller 230 determines the mixture such that the mixture has an optimal taste. The controller 230 can control a gate of the chamber to dispense food stored according to the determined mixture.

The controller 230 may determine which compartment of the storage chamber to store a particular type of food based on the identification and classification. For example, if the food being held in the pre-storage chamber is classified as rice, the controller 230 determines that the food is to be transferred from the pre-storage chamber to a compartment of the storage chamber that is used to stored rice.

The controller 230 then controls 425 the rice cooker based on the mixture.

In some embodiments, raw images captured by the camera 112 may be pre-processed to enhance contrast before being input to the machine learning models 220. For example, linear variation algorithm, exponential variation algorithm, histogram variation algorithm and the like image processing mechanisms can be applied. By doing this, image features can be rendered more obvious thereby to improve the accuracy in the machine learning model's output.

Figure 5:
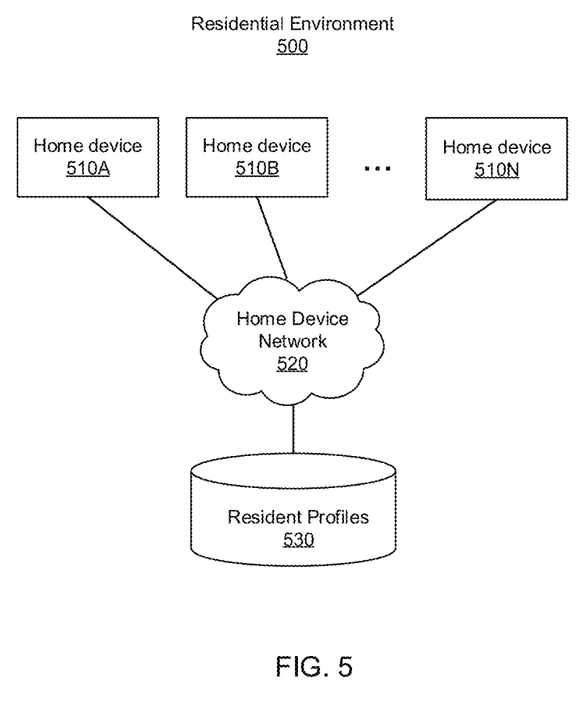
FIG. 5 is a block diagram of a residential environment that includes a rice cooker, according to an embodiment.

In another aspect, the rice cooker may be part of a home network. FIG. 5 is a block diagram of a residential environment that includes a rice cooker, according to an embodiment. The residential environment 500 is an environment designed for people to live in. The residential environment 500 can be a dwelling, such as a house, a condo, an apartment, or a dormitory. The residential environment 500 includes home devices 510A-N, including the cooking appliance described above. It also includes a home device network 520 connecting the home devices 510, and a resident profiles database 530 that contains residents' preferences for the home devices. The components in FIG. 5 are shown as separate blocks but they may be combined depending on the implementation. For example, the resident profiles 530 may be part of the home devices 510. Also, the residential environment 500 may include a hub for the network 520. The hub may also control the home devices 510. The network 520 preferably also provides access to external devices, such as cloud-based services.

The home devices 510 are household devices that are made available to the different persons associated with the residential environment 500. Examples of other home devices 510 include HVAC devices (e.g., air conditioner, heater, air venting), lighting, powered window and door treatments (e.g., door locks, power blinds and shades), powered furniture or furnishings (e.g., standing desk, recliner chair), audio devices (e.g., music player), video device (e.g., television, home theater), environmental controls (e.g., air filter, air freshener), kitchen appliances (e.g., rice cooker, coffee machine, refrigerator), bathroom appliances, and household robotic devices (e.g., vacuum robot, robot butler). The home devices 510 can include other types of devices that can be used in a household.

The resident profiles 530 typically include information about the different residents, such as name, an identifier used by the system, age, gender, and health information. The resident profiles 530 can also include settings and other preferences of the home devices 510 selected by the different residents.

The network 520 provides connectivity between the different components of the residential environment 500 and allows the components to exchange data with each other. The term "network" is intended to be interpreted broadly. It can include formal networks with standard defined protocols, such as Ethernet and InfiniBand. In one embodiment, the network 520 is a local area network that has its network equipment and interconnects managed within the residential environment 500. The network 520 can also combine different types of connectivity. It may include a combination of local area and/or wide area networks, using both wired and/or wireless links. Data exchanged between the components may be represented using any suitable format. In some embodiments, all or some of the data and communications may be encrypted.

The functionality described above can be physically implemented in the individual cooking appliance (one of the home devices 510), in a hub, in a cloud-based service or elsewhere accessible by the cooking appliance via the network 520.

Although the detailed description contains many specifics, these should not be construed as limiting the scope of the invention but merely as illustrating different examples. It should be appreciated that the scope of the disclosure includes other embodiments not discussed in detail above. For example, although an oven is used as the primary example, other cooking appliances can also be used. These include steamers, microwave ovens and toaster ovens. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

Alternate embodiments are implemented in computer hardware, firmware, software, and/or combinations thereof. Implementations can be implemented in a computer program product tangibly embodied in a machine-readable storage device for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

What is claimed is:

1. A rice cooker comprising:
a first chamber configured to hold food items;
a second chamber including multiple compartments placed below the first chamber, wherein a respective compartment of the multiple compartments is configured to store a respective type of food item; wherein the first chamber comprises multiple gates configured to transfer food items to each of the compartments of the second chamber
a cooking chamber placed below the second chamber through a conduit;
a camera positioned to view food items stored in the first chamber; and
a processing system configured to:
cause the camera to capture one or more images of the food items in the first chamber;
provide the captured images as an input to one or more machine learning models, the one or more machine learning models configured to classify a type of the food item;
distribute the food item to a respective compartment of the second chamber based on the classified type of the one or more machine learning models;
determine a mixture of the respective types of food items stored in the second chamber with a predetermined ratio; and
select a cooking mode based on the determined mixture of the multiple types of food with the predetermined ratio of the type of food.

2. The rice cooker of claim 1, wherein the second chamber comprises one or more gates positioned on a bottom support of the second chamber, the gate configured to create one or more openings through the second chamber.

3. The rice cooker of claim 2, wherein the processing system is configured to cause the one or more gates to create a first opening through a first compartment and a second opening through a second compartment, a dimension of the first opening and a dimension of the second opening determined according to a first type of the food item and a second type of the food item.

4. The rice cooker of claim 3, wherein the processing system is configured to determine that a dimension of the first opening is larger than the dimension of the second opening responsive to determining that a unit dimension of the first type of the food item is larger than a unit dimension of the second type of the food item.

5. The rice cooker of claim 2, wherein the camera is configured to move from a portion of the first chamber to another portion of the first chamber.

6. The rice cooker of claim 1, wherein the camera is positioned on a top lid of the first chamber.

7. The rice cooker of claim 1, wherein the camera is affixed to a camera holder separate from the first chamber and the first chamber is configured to rotate.

8. The rice cooker of claim 1, wherein the one or more machine learning models are stored in a computer readable storage medium remote from the rice cooker, and the rice cooker is configured to access the one or more machine learning models via a network connection.

9. The rice cooker of claim 1, wherein the one or more machine learning models are stored in a computer readable storage medium included in the rice cooker.

\* \* \* \* \*